(12) United States Patent
Medwed

(10) Patent No.: US 11,898,027 B1
(45) Date of Patent: Feb. 13, 2024

(54) TEXTURED MALLEABLE PLAY SLIME MATERIALS

(71) Applicant: GennComm LLC, Tarzana, CA (US)

(72) Inventor: Jeremy Brian Medwed, Woodland Hills, CA (US)

(*) Notice: Subject to any disclaimer, the term of this patent is extended or adjusted under 35 U.S.C. 154(b) by 608 days.

(21) Appl. No.: 17/090,344

(22) Filed: Nov. 5, 2020

Related U.S. Application Data

(60) Provisional application No. 62/931,542, filed on Nov. 6, 2019.

(51) Int. Cl.
*C08L 29/04* (2006.01)
*A63H 33/00* (2006.01)

(52) U.S. Cl.
CPC ............ *C08L 29/04* (2013.01); *A63H 33/001* (2013.01); *C08L 2205/03* (2013.01); *C08L 2205/16* (2013.01)

(58) Field of Classification Search
CPC .. C08L 29/04; C08L 2205/03; C08L 2205/16; A63H 33/001
USPC .......................................................... 524/45
See application file for complete search history.

(56) References Cited

PUBLICATIONS

Xu et al., "Anti-impact response of Kevlar sandwich structure with silly putty core", (Composite Science and Technology, 153 (2017) 168-177). (Year: 2017).*

* cited by examiner

*Primary Examiner* — Ling Siu Choi
*Assistant Examiner* — Ronald Grinsted
(74) *Attorney, Agent, or Firm* — GUGLIOTTA & GUGLIOTTA LPA

(57) ABSTRACT

The present invention provides an improved non-Newtonian play material consisting essentially of a play slime material combined with a non-soluble fiber additive. The malleable material may adapted as any known malleable play material including binder, filler, fluid and a filler setting inhibitor. The non-soluble fiber may be a coarse or fine, long or short, polyester, silk or other similar or equivalent material. The fibers may be of different colors. The fibers may be of different textures or a combination of textures. The fibers may be incorporated in various amounts. The ratio of non-Newtonian fluid to fiber rations may be between about 2:1 to about 50:1 by weight. The use of one or more than one different color of fiber may be utilized. The resulting play material compound may be utilized in hand molding or manipulation in which substantial enjoyment and amusement is provided in the handling of the play material.

18 Claims, 2 Drawing Sheets
(2 of 2 Drawing Sheet(s) Filed in Color)

Course Fiber

Fine Fiber

TEXTURED MALLEABLE PLAY SLIME MATERIALS

RELATED APPLICATIONS

The present application claims the benefit of U.S. Provisional Application Ser. No. 62/931,542, filed on Nov. 6, 2019, which is incorporated by reference herein as if fully rewritten.

BACKGROUND OF THE INVENTION

1. Field of the Invention

The present invention relates generally to malleable play materials and, more specifically, to an improved malleable play material having enhanced visual and tactile texturing.

2. Description of the Related Art

Various types of pliable play materials exist, from clays to doughs. Traditionally used for molding and sculpting, such materials are for use in molding shapes. In a slightly more pliable formulation, materials can be made into play shapes and formed into a squeezable "stress ball" configuration. A most recent and growing category of materials includes tactile play compound, generically referred to a "slime." Such play slimes are more free-flowing and provide entertainment functions through they texture, consistency, flowability, appearance, etc.

With play slimes representing the largest and still growing subcategory of malleable play materials, their popularity and continued growth indications that a need still exists for more and different play materials that may extend these product lines.

Consequently, improvements in the texture, appearance, tactility or other characteristics are desired.

SUMMARY OF THE INVENTION

It is an object of the present invention to provide an improved malleable play material It is an feature of the present invention to provide a modified play slime having an augmented tactility and handfeel.

Referring now to the present invention, an improved non-Newtonian material is provided as a malleable play material consisting essentially of a play slime material combined with a non-soluble fiber additive. The non-Newtonian fluid may be adapted as any known malleable play material including binder (guar gum, Elmer's® glue, etc.), filler (talcum powder, sand, chemical thickeners, etc.), a fluid (water, glycerin, etc.) and a filler setting inhibitor (borax, carrageenan, etc.). The non-soluble fiber may be a coarse or a fine, a long or a short, polyester, silk or other similar or equivalent material. The fibers may be of different colors. The fibers may be of different textures or a combination of textures. The fibers may be incorporated in various amounts. The ratio of non-Newtonian fluid to fiber rations may be between about 2:1 to about 50:1 by weight. The use of one or more than one different color of fiber may be utilized. The resulting play material compound may be utilized in hand molding or manipulation in which substantial enjoyment and amusement is provided in the handling of the play material.

Advantages of the present invention allow for a slime dough to be created having different textures, elasticity, look or feel based upon the type and/or amount of fibers incorporated in a particular formulation.

An advantage of one type of formulation allows for increasing elasticity in the creation of a more "stretchy" play slime material.

An advantage of other types of formulations allows for creation of play slime materials having a coarser feel.

A further advantage of the present invention allows for play slime materials having a reveal of fuzz/texture when the slime is stretched and breaks.

Further objects, features, elements and advantages of the invention will become apparent in the course of the following description.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The advantages and the features of the present invention will become better understood with reference to the following more detailed description and the claims taken in conjunction with the accompanying drawings, in which like elements are identified with like symbols, and in which:

The advantages and the features of the present invention will become better understood with reference to the following more detailed description and the claims taken in conjunction with the accompanying drawings, in which like elements are identified with like symbols, and in which:

The color drawings are necessary as the only practical medium by which aspects of the claimed subject matter may be accurately conveyed. For example, the claimed invention relates to play slimes having various colors and textures and the color drawings are of environments with various levels of visibility, which are necessary to illustrate features of the claims.

DESCRIPTION OF THE PREFERRED EMBODIMENTS

Figure 2:
FIG. 2 is a photograph thereof showing the play slime material stretched to cleave
Figure 1:
FIG. 1 is photograph of a textured malleable play slime material according to an exemplary embodiment of the present invention.
Figure 3:
FIG. 3 is a photograph of an exemplary course fiber for use therewith.
Figure 4:
FIG. 4 is a photograph of an exemplary fine fiber for use therewith.

The best mode for carrying out the invention is presented in terms of its preferred embodiment, herein depicted within the FIGS. 1-4.

1. Detailed Description of the Figures

The present invention malleable play material compound within the tactile toy category currently occupied by a myriad of products from stress balls to "slime" to squishy toys. By way of example for better understanding, current "slime" play materials according to the PRIOR ART provide compounds having an unusual loose and wet tactile feel utilizing a combination of a malleable binders and a large quantity of fillers such as sand. The combined granular character of the sand together with the adhesive properties of the malleable play material binder result in the creation of a play material that has a different tactile feel or physical properties from other conventional clays or doughs. As should be recognized by those skilled in the art, a substantial variety of play material compounds may are formed by providing the binder portion and filler or sand materials in proportionate parts similar to those set forth in Table 1.

TABLE 1

| Ingredient | Percent by Weight |
|---|---|
| Malleable Binder | 15.00-20.00 |
| Sand | 80.00-85.00 |
| Fragrance | As needed |
| Colorant | As needed |

As can be seen in Table 1, conventional malleable slime play material uses essentially two ingredients, a binder preferably comprising between fifteen and twenty percent by weight while the sand or similar granulate fill preferably comprises between eighty and eighty-five percent. In addition, conventional malleable slime play materials may also include a fragrance or a colorant material as needed. The fragrance material may be added solely to enhance the fragrance of the compound. Similarly, a colorant material may be added solely to enhance the color shade of the appearance.

By way of additional example, another existing play material is marketed as Nickelodeon™ Gak™ Splat, a product of Mattel, Inc. As a non-Newtonian fluid made from guar gum, Gak™ has properties between Silly Putty® and Slime®. Gak™ is thick and will stretch and break like Silly Putty®, but it will flow and is cold to the touch like Slime®. Table 2 sets forth a composition of the GAK™ play material.

TABLE 2

| Ingredients | Percent by Weight |
|---|---|
| Part I | 20.0 |
| Deionized Water | 78.29 |
| Guar Gum Polymer 2436 | 3.2 |
| Monosodium Phosphate | 1.00 |
| EDTA, Disodium Salt | 0.20 |
| Dowicil 200 | 0.20 |
| Methylparaben | 0.20 |
| Propylparaben | 0.04 |
| Dipotassium Phosphate | 5.90 |
| Tricalcium Phosphate | 4.38 |
| Carrageenan Ex 9548 | 0.20 |
| Carbowax 400 | 1.00 |
| Glycerin 99.5% | 5.18 |
| Methocel 40-202 | 0.20 |
| Total Weight (Binder) | 100.00 |
| Part II | |
| Sand | 80.00 |
| Fragrance | As Needed |
| Total Weight (Compound) | 100.00 |

Various other formulations are known as recipes for creating non-Newtonian play materials that emulate the properties of GAK™ play material. Table 3 sets forth a first alternate composition, and Table 4 sets forth a second alternate composition for such play materials that are available to craftspeople known to such make homemade versions of such materials using conventional household products.

TABLE 3

| Ingredient | Amount |
|---|---|
| Elmer's ® white glue | 5 teaspoons (25 mL) |
| talcum powder (Baby powder) | 1 teaspoon (5 mL) |
| water | 4 teaspoons (20 mL) |
| saturated borax solution (sodium borate, Na2B4O710H2O) | 1 teaspoon (5 mL) |

TABLE 4

| Ingredient | Amount |
|---|---|
| guar gum | ½ teaspoons (2.5 mL) |
| talcum powder (Baby powder) | 1 teaspoon (5 mL) |
| water | 20 teaspoons (100 mL) |
| saturated borax solution (sodium borate, Na2B4O710H2O) | 2 teaspoons (10 mL) |

Other variations are known and available for permutations, including materials with a more clear & gooey texture (replacing water with polyvinyl alcohol), those that are slimy and ooze-like (made of filtered mixture of skim milk, vinegar and baking soda), and those that resemble quicksand (made of cornstarch and water).

The present invention provides an improve and novel material from such other malleable play material compound. As shown in conjunction with FIG. 1-4, the present invention provides a play material compound having an unusual tactile feel utilizing a combination of a non-Newtonian fluid and a quantity of fibrous solids. As should now become apparent to those having ordinary skill in the relevant art, in combination with the present teachings, the incorporation of fibrous solids within the non-Newtonian fluid creates a new, modified material in which the non-Newtonian characteristics can be modified for flow, visual appearance, texture, color or other properties.

According to one embodiment, the creation of a slime material with a "furry" appearance may be formed by incorporation of a poly or silk additive. It is an aspect of the present invention to provide changes in appearance, texture nd flowability though changes in the relative amounts of fiber incorporated, as well as variations in the type of fibers, including materials, lengths, and thickness. For purposes of clarification and by way of example, but not meant as a limitation, the use of finer fiber materials may result in a play material that has increased elasticity, while the use of coarser fiber materials may result in a play material that has a more wiry, fuzzy or furry appearance. Depending on the length and circumference of the fibre used, as well as the fiber material type, different types of slime mixtures may be created. Further, the use of a polyester fibre such as that used in stuffing for most stuffed animals and pillows generally includes different mixtures of lengths and circumference, and as such will provide yet a different effect.

By way of example, and not as a limitation, the use of a soft poly mixture with a finer, smaller circumference, shorter lengths of poly fibre in a traditional slime mixture make a fuzzy slime effect. In another example, i a carrageenan or similar based slime mixture in addition with a finer, smaller circumference, slightly longer fiber length creates a super stretchy slime. The fibers, when stretched in this slime mixture tend to align themselves on top of each other, giving the slime mixture a kind of scaffolding to hold onto to be able to stretch further. Additionally, the use harder/coarse/wiry polyester fibre having a larger circumference will have a much springier effect but will also create a coarser fuzzy slime. This effect is achieved because the polyester fibre does not have a strong bond to the slime.

The further incorporation of different colorants may along with the inclusion of coarse fiber materials may provide a novelty play material having providing the appearance and consistency of feces. To those having ordinary skill in the relevant art, the later variation will be seen as a particular benefit for use in conjunction with any of the various products within the toy market subchannel referred to as "gross toys". In such an embodiment a mixture of red and yellow colors in a 1:10 ratio (1 drop red to 10 drops yellow) may be included for creating a tan colored play material. Additionally, the incorporation of and additional 1 drop of blue color will create a material having a darker brown appearance. Alternately, the use of additional red or yellow colorants may create an appearance of gray or black; and the use of orange and green may be used to lighten a tan color. In any embodiment the us of a colored, preferably black fiber material, such as a black graft fur, may further enhance the effect.

It will be recognized by those skilled in the art that variations of the percentages of components from the components set forth above may be undertaken without departing from the spirit and scope of the present invention. The important aspect with respect to the present invention is the combination of a malleable play material to be used as a binder when combined with a selected amount of non-soluble fiber yielding a play material having a novel and unusual tactile characteristic.

2. Operation of the Preferred Embodiment

In operation a novelty toy play material is provided formed of a combination of a non-Newtonian fluid and a non-soluble fiber material. The non-Newtonian fluid may adapted as any known malleable play material including binder (guar gum, Elmer's® glue, etc.), filler (talcum powder, sand, chemical thickeners, etc.), a fluid (water, glycerin, etc.) and a filler setting inhibitor (borax, carrageenan, etc.). The non-soluble fiber may be a coarse or fine, long or short, polyester, polystyrene, silk or other similar or equivalent material. The fibers may be of different colors. The fibers may be of different textures or a combination of textures. The fibers may be incorporated in various amounts.

According to a preferred embodiment of the present invention, the ratio of non-Newtonian fluid to fiber rations may be between about 2:1 to about 50:1 by weight.

According to the preferred embodiment of the present invention, the ratio of non-Newtonian fluid to fiber rations may be between about 3:1 to about 5:1 by weight.

According to another preferred embodiment of the present invention, the use of one or more than one different color of fiber may be utilized. By way of further example, and not meant as a limitation, Table 5 indicates an exemplary embodiment of a "blue" colored "hairy slime" formulation, with Table 6 and Table 7 exemplifying a green or orange variant, respectively.

TABLE 5

Blue Hairy Slime

| Chemical Name | CAS Number | Concentration or concentration ranges (%? |
|---|---|---|
| Water | 7732-18-5 | 82.71 |
| Polyvinyl alcohol | 25213-24-5 | 7.83 |

TABLE 5-continued

Blue Hairy Slime

| Chemical Name | CAS Number | Concentration or concentration ranges (%? |
|---|---|---|
| Phenoxyol | 122-99-6 | 0.7 |
| Glycerol | 56-81-5 | 5.7 |
| Borax | 12179-04-3 | 0.06 |
| Sodium phosphate | 7558-79-4 | 0.3 |
| CMC-Na | 9004-32-4 | 0.2 |
| Polyethylene | 9002-88-4 | 1 |
| pigment blue27 | 12240-15-2 | 1.5 |

TABLE 6

Green Hairy Slime

| Chemical Name | CAS Number | Concentration or concentration ranges (% |
|---|---|---|
| Water | 7732-18-5 | 82.71 |
| Polyvinyl alcohol | 25213-24-5 | 7.83 |
| Phenoxyol | 122-99-6 | 0.7 |
| Glycerol | 56-81-5 | 5.7 |
| Borax | 12179-04-3 | 0.06 |
| Sodium phosphate | 7558-79-4 | 0.3 |
| CMC-Na | 9004-32-4 | 0.2 |
| Polyethylene | 9002-88-4 | 1 |
| pigment green 7 | 1328-53-6 | 1.5 |

TABLE 7

Orange Hairy Slime

| Chemical Name | CAS Number | Concentration or concentration ranges (% |
|---|---|---|
| Water | 7732-18-5 | 82.71 |
| Polyvinyl alcohol | 25213-24-5 | 7.83 |
| Phenoxyol | 122-99-6 | 0.7 |
| Glycerol | 56-81-5 | 5.7 |
| Borax | 12179-04-3 | 0.06 |
| Sodium phosphate | 7558-79-4 | 0.3 |
| CMC-Na | 9004-32-4 | 0.2 |
| Polyethylene | 9002-88-4 | 1 |
| pigment orange 38 | 12236-64-5 | 1.5 |

The resulting play material compound may be utilized in accordance with a variety of play material patterns such as those presently used in molding or forming various articles of the play material. In addition, the present invention play material compound may be used in combination with conventional material extruders or other molding or forming apparatus. Finally, the present invention play material compound may be utilized in hand molding or manipulation in which substantial enjoyment and amusement is provided in the handling of the play material.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar caselaw or subsequent precedent should not be made if any future claims are added or amended subsequent to this Patent Application.

Having thus described the invention, what is claimed as new and desired to be secured by Letters Patent is as follows:

1. A play material comprising:
a non-Newtonian fluid; in combination with
a fibrous solids incorporated within the non-Newtonian fluid;
wherein said fibrous solid comprises a material selected from a group consisting of: polyester; polystyrene; and silk.

2. The play material of claim 1, wherein said combination has a selected characteristic selected from a group consisting of: flow, visual appearance, texture, color; and elasticity.

3. The play material of claim 2, wherein said selected characteristic is the creation of a slime material with an appearance selected from a group consisting of: a textured; and a furry appearance.

4. The play material of claim 1, wherein said fibrous solids comprise a physical characteristic selected from a group consisting of: similar fiber lengths; variable fiber lengths; similar fiber thicknesses; variable fiber thicknesses; fibers having a single color; and a combination of fibers having more than one color.

5. The play material of claim 1 comprising:
approximately 50 to approximately 98 percent of a total by weight of the non-Newtonian fluid; and
approximately 50 to approximately 2 percent of a total by weight of the fibrous solids.

6. The play material of claim 1, further comprising one or more colorant or fragrance materials.

7. The play material of claim 5, further comprising one or more colorant or fragrance materials.

8. The play material of claim 1, further comprising:
Water at a concentration of about 82.71% by weight;
Polyvinyl alcohol at a concentration of about 7.83% by weight;
Phenoxyol at a concentration of about 0.7% by weight;
Glycerol at a concentration of about 5.7% by weight;
Borax at a concentration of about 0.06% by weight;
Sodium phosphate at a concentration of about 0.3% by weight;
Carboxymethyl cellulose at a concentration of about 0.2% by weight;
fibers at about 1% by weight; and
a pigment at a concentration of about 1.5% by weight, wherein all percents by weight are based on the total weight of the play materials.

9. A novelty play material comprising:
a non-Newtonian fluid; in combination with
a fibrous solids incorporated within the non-Newtonian fluid; wherein said fibrous solid comprises a material selected from a group consisting of: polyester; and silk;
a colorant, said colorant selected from a combination of a group consisting of: a red colorant; a yellow colorant; and a blue colorant;
said material comprises a physical characteristic selected from a group consisting of: similar fiber lengths; variable fiber lengths; similar fiber thicknesses; variable fiber thicknesses; fibers having a single color; and a combination of fibers having more than one color.

10. The novelty play material of claim 9, comprising:
approximately 50 to approximately 98 percent by weight of the non-Newtonian fluid; and
approximately 50 to approximately 2 percent by weight of the fibrous solids.

11. The novelty play material of claim 9, wherein the play material emulates an appearance and a texture of faecal matter.

12. The novelty play material of claim 10, wherein the play material emulates an appearance and a texture of faecal matter.

13. The play material of claim 2, wherein said combination has a selected characteristic selected from a group consisting of: flow, visual appearance, texture, color; and elasticity.

14. The play material of claim 4, wherein said selected characteristic is the creation of a slime material with an appearance selected from a group consisting of: a textured; and a furry appearance.

15. The play material of claim 5, wherein said selected characteristic is the creation of a slime material with an appearance selected from a group consisting of: a textured; and a furry appearance.

16. The play material of claim 6, wherein said selected characteristic is the creation of a slime material with an appearance selected from a group consisting of: a textured; and a furry appearance.

17. The play material of claim 7, wherein said selected characteristic is the creation of a slime material with an appearance selected from a group consisting of: a textured; and a furry appearance.

18. The play material of claim 8, wherein said selected characteristic is the creation of a slime material with an appearance selected from a group consisting of: a textured; and a furry appearance.

\* \* \* \* \*